FRANK HIGEL.
Improvement in Vises.

No. 114,817. Patented May 16, 1871.

Witnesses.
James A. Weir
Edward Weir.

Inventor
Frank Higel.

United States Patent Office.

FRANK HIGEL, OF PHILADELPHIA, PENNSYLVANIA, ASSIGNOR OF ONE-HALF HIS RIGHT TO JAMES A. WEIR, OF SAME PLACE.

Letters Patent No. 114,817, dated May 16, 1871.

IMPROVEMENT IN VISES.

The Schedule referred to in these Letters Patent and making part of the same.

I, FRANK HIGEL, of Philadelphia, State of Pennsylvania, have invented certain Improvements in Vises, of which the following is a specification.

The invention relates to that class of vises called universal self-adjusting vises; the object of which is to construct a vise which, being actuated by a single screw, will adapt itself to any form it is to hold. This I accomplish by connecting the front (or moving jaw) and back jaws by a screw (with slide cover) running through pivots in both jaws; also, by hinging the lower slide, thereby allowing the jaws to move freely and adapt themselves to the shape of the article to be held, whether straight or taper.

Figure 1:
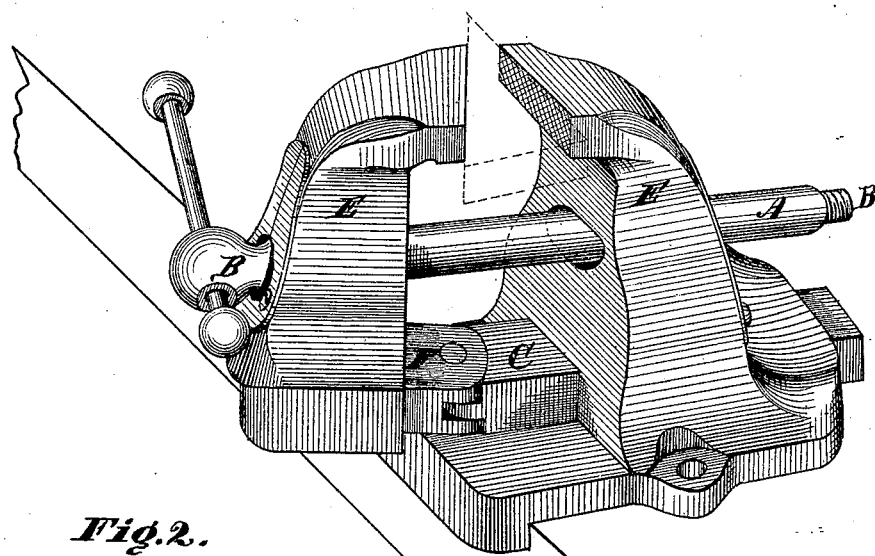
Figure 1 is a side elevation of a vise embodying my invention.
Figure 2:
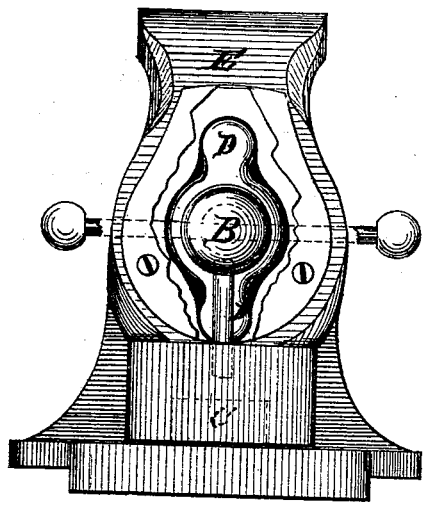
Figure 2 is the end view of the same.
Figure 3:
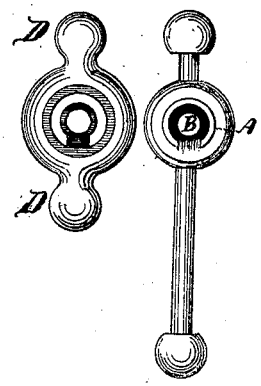
Figure 3 is the pivot, through which the screw and slide cover pass.

E E are the jaws and body of the vise, which should be substantially constructed of iron, to resist the strain when in use.

D D are the pivots, which must be placed in the center of jaws, and in an upright position, so as to receive screw and slide cover that works the front or moving jaw in and out, the back jaw always remaining stationary.

C is the lower smooth slide, which passes through back jaw, and slides in and out when the screw is worked.

F is the hinge-joint in lower slide, and operates in conjunction with the pivots, thereby allowing the moving jaw to angle and adapt itself to any tapered article to be held.

I claim as my invention—

The combination of the jaws E, jointed slide C, pivots D, and the screw-bolt for actuating the movable jaws, substantially as described.

FRANK HIGEL.

Witnesses:
   JAMES A. WEIR,
   JAMES WEIR.